July 25, 1961  C. F. CARLZEN ET AL  2,993,272
SOLDERING DEVICE

Filed Aug. 26, 1958  3 Sheets-Sheet 1

INVENTORS
CARL F. CARLZEN
MILAN L. LINCOLN
BY Norman J. O'Malley
ATTORNEY

July 25, 1961  C. F. CARLZEN ET AL  2,993,272
SOLDERING DEVICE
Filed Aug. 26, 1958  3 Sheets-Sheet 2

INVENTORS
CARL F. CARLZEN
MILAN L. LINCOLN
BY
Norman J. O'Malley
ATTORNEY

United States Patent Office 2,993,272
Patented July 25, 1961

2,993,272
SOLDERING DEVICE
Carl F. Carlzen, Torrance, Calif., and Milan L. Lincoln, Batavia, N.Y., assignors, by mesne assignments, to Sylvania Electric Products Inc., Wilmington, Del., a corporation of Delaware
Filed Aug. 26, 1958, Ser. No. 757,379
5 Claims. (Cl. 29—503)

This invention relates generally to soldering and more specifically to use of a solder wave for soldering electrical and mechanical portions of a circuit board.

Various forms of soldering devices have been proposed and utilized for soldering electrical and mechanical portions of circuit boards, especially circuit boards of the so-called printed circuit type. Most all of these structures involve the simultaneous application of molten solder to a plurality of points on the circuit board.

One of the first structures proposed was merely a simple solder reservoir for dipping the unit to be soldered. Other structures used selective soldering techniques wherein molten solder was pumped through a plurality of tubes to form a fountain of molten solder at the positions where solder was desired. Use of a transverse solder wave also has been tried; however, considerable difficulty has been experienced with shorts and other circuit problems arising from icicles or tears of hardened solder which tend to form beneath the soldered surface. Also, spidering or undesirable soldering connections bridging desirably separate conductors is common in units soldered by devices currently proposed.

Thus it is an object of this invention to solder rapidly desired interconnections on a circuit board in such a manner as to minimize formation of icicles or interconnecting bridges of solder.

It is a further object of this invention to minimize circuit board warpage due to absorption of heat during the soldering period.

It is a still further object of this invention to minimize spidering and icicle formation over a broad range of feed rates through a soldering device.

For a better understanding of this invention, together with other and further objects, advantages and capabilities thereof, reference is made to the following description and appended claims in connection with the accompanying drawings in which:

Briefly describing one aspect of the invention, the above and other objects are achieved in a structure comprising means for forming a wave of molten solder transverse to the direction of travel of the circuit boards to be soldered in combination with means for providing adjustable immersion and emersion rates of component terminals depending from the circuit board into and out of the generated solder wave.

The term circuit board or boards as used herein shall be construed to mean any substantially planar support of insulating material formed to hold circuit conductors along at least one surface thereof for connection to circuit components generally mounted on the upper or other surface of the support. The conductors may be formed by any one or more of a number of techniques such as by plating, printing, stamping or in any other manner.

Figure 1:
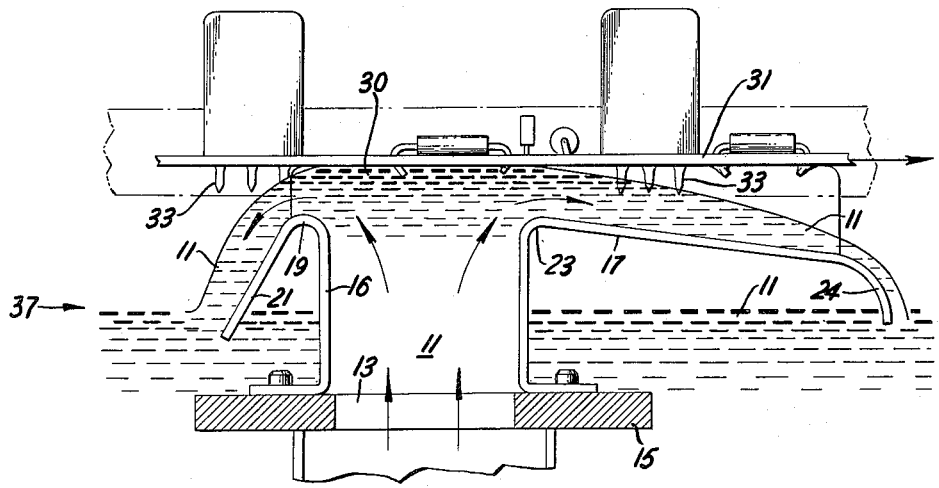
FIG. 1 shows a cut-away section of a solder wave orifice.
Figure 2:
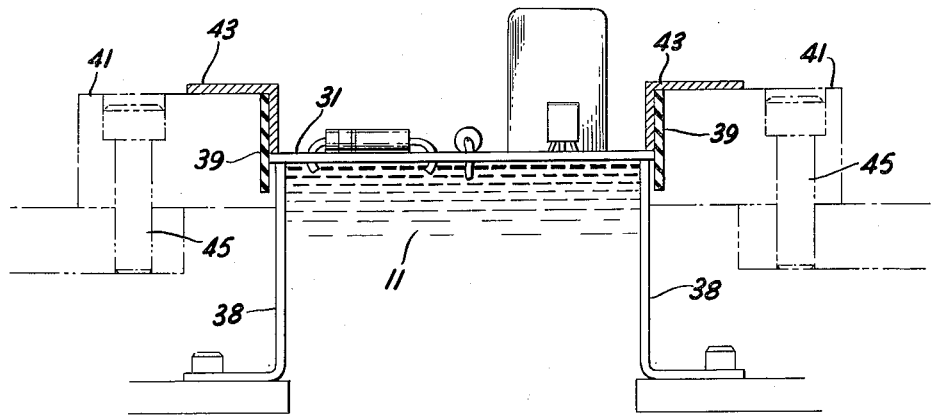
FIG. 2 shows an end view of a solder wave orifice.

Elements of one embodiment of the invention are clearly shown in FIGS. 1 and 2. Molten solder 11 is pumped or forced through an aperture 13 in a submerged plate 15 up through an orifice formed in part by input end plate 16 and the output end apron plate 17. The input end plate 16 has an abrupt overflow lip 19 which includes a fall-off skirt 21. The apron plate 17 is formed to provide a gradual decline in the surface level of overflow solder and is substantially linear between the output lip 23 and the return lip 24.

As can best be seen in FIG. 1 molten solder 11 which is pumped through orifice 13 forms a solder wave which crests generally at 30 to overflow toward both the input end and the output end. Circuit boards, which may be of the printed circuit type such as shown at 31, are passed over the crest 30 of the solder wave in such manner that the depending component terminals 33 along with the bottom surface or underside of the circuit board are brought into intimate contact with the molten solder 11 at least over the solder wave crest 30 and also over the output apron 17. Overflow solder flows back into a solder reservoir having an upper surface level shown generally at 37 in FIG. 1. Details and description of a suitable solder reservoir will be hereinafter explained in connection with FIGS. 3 and 4.

Referring to FIG. 2 it can be seen that the side plates 38 which keep the molten solder from overflowing toward the sides of the unit also act to form two sides of the solder wave orifice and to form supports for the circuit boards in passing over the solder wave. Though other circuit board advancing means may be used, the structure shown includes flexible drive belts 39 which are preferably of the endless type made from a synthetic rubber suitable for high temperature use. Belts 39 are driven in a direction to advance the circuit boards by a variable speed drive, not shown, including suitable pulleys and a drive motor.

A slot in each side block 41 acts to guide the associated guide belts 39. Angle elements 43, which act as hold-down structures for holding the circuit boards in position against the force of the solder wave on the top edges of side plates 35, also act to retain the side belts 39 in the slots in side blocks 41. Side blocks 41 may be bolted to retaining plates through the use of bolts such as shown schematically at 45.

As the circuit boards progress from the input end to the output end of the soldering device, that is from left to right in FIG. 1, the depending terminals 33 are immersed in molten solder at a rate governed in part by the speed of drive belts 39. Thus as any given terminal approaches the input end of the solder wave it strikes the surface of the molten solder overflowing input end lip 19 and is rapidly immersed. For any given speed of the drive belts 39 the immersion rate can be controlled by bending skirt 21 relative to lip 19. Thus, if skirt 21 is bent down the immersion rate is increased, and if skirt 21 is bent up the immersion rate is decreased.

The rate of emersion of component terminals 33 from out of the molten solder 11 can be controlled by bending the output end apron 17 either up or down relative to lip 23. Thus if the end of apron 17 is raised toward the horizontal plane, the rate of emersion is decreased, and if the end of apron 17 is lowered the emersion rate is increased.

By providing overflow apron 17 with a linear portion which may be adjusted, as far as its angle with the horizontal plane is concerned, it is possible to minimize formation of icicles or solder tears and minimize shorting or spidering within a relatively broad range of circuit board advancement rates and within a relatively broad range of solder temperatures.

In an embodiment actually built using soft solder of 60% tin and approximately 40% lead, operating at a temperature between 460° and 480° F. an apron 17 of 3" to 5" over the linear portion was found to operate satisfactorily at a circuit board advancement rate of 540 feet per hour using a resin based flux which was mildly activated. Substantially higher rates of circuit board advancement would require a longer apron in order to maintain the desired emersion rate.

Figure 3:
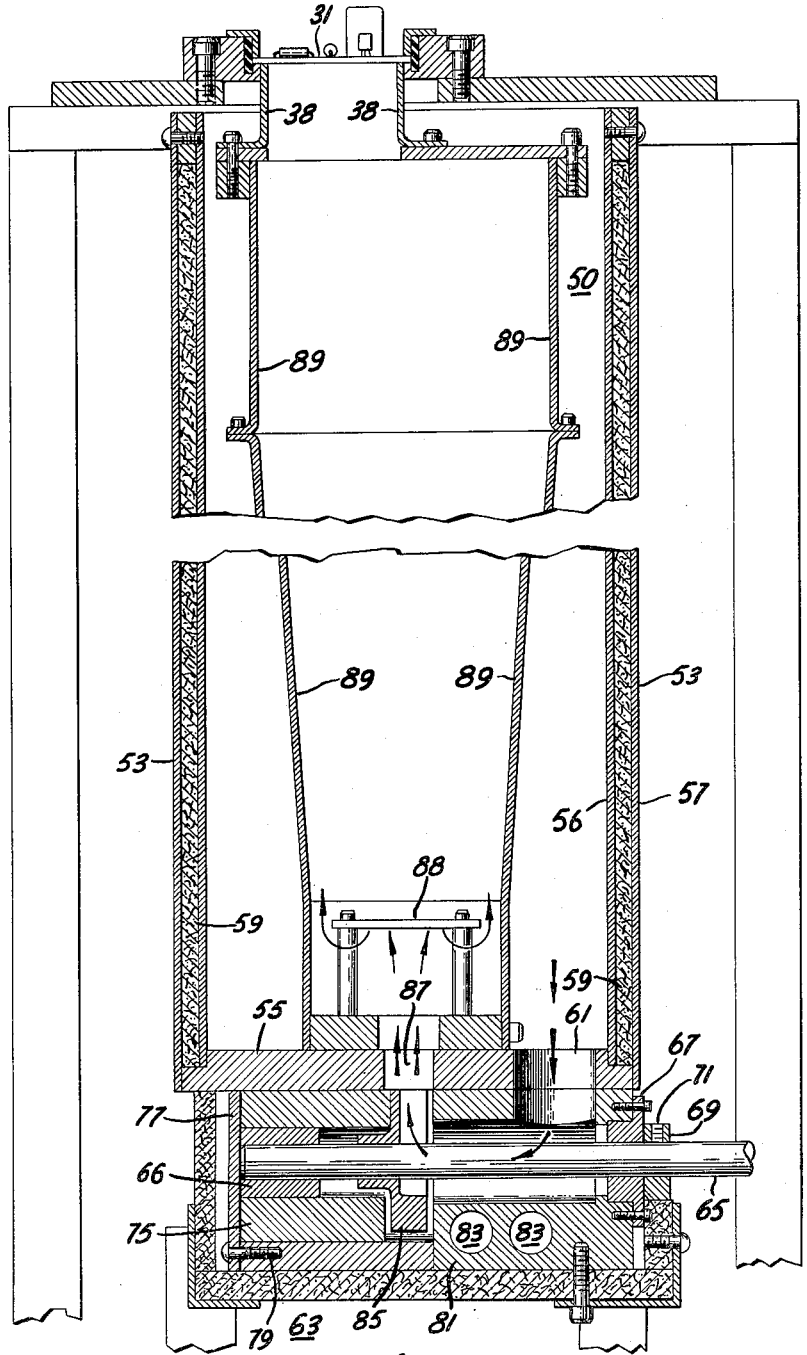
FIGS. 3 and 4 show a solder wave unit including the solder pump.
Figure 4:
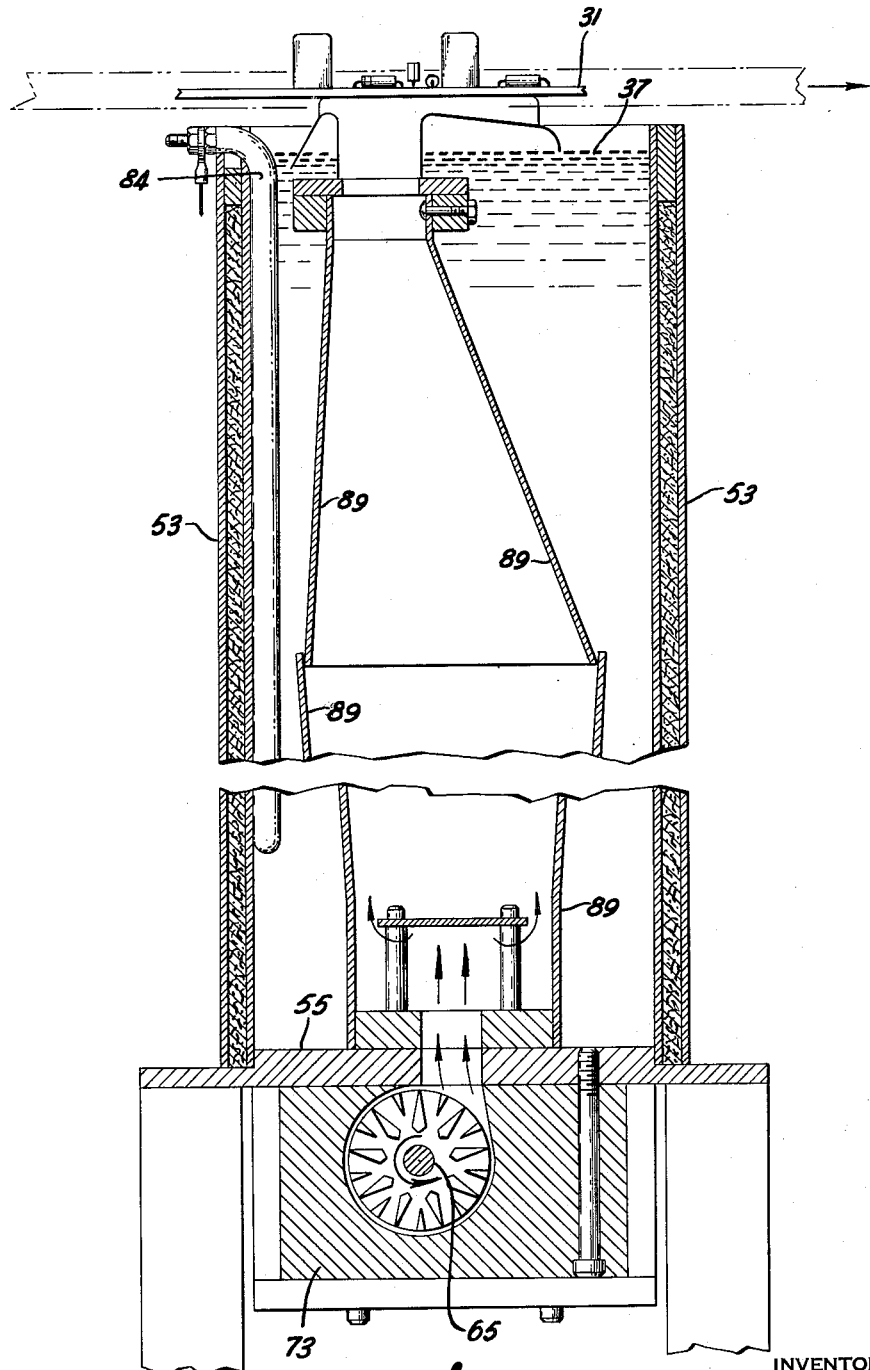

Though any type of solder wave forming device may be used, for purposes of completing the description of a complete working embodiment reference is made to FIGS. 3 and 4 which show a solder reservoir and pump for forming a solder wave as shown in FIGS. 1 and 2.

The solder reservoir generally shown at 50 includes side walls 53 and a bottom plate 55. In order to minimize the amount of heat required to maintain the solder 11 in the molten state, side walls 53 preferably comprise an inner metal plate 56 and an outer metal plate 57 separated by a thickness of insulating material 59. The bottom plate 55 of the reservoir includes an aperture 61 in communication with the input of a solder pump generally shown at 63.

The pump shown in FIGS. 2 and 3 is of the radial type utilizing a drive shaft 65 journaled to rotate in a carbon type bearing 66 and through a seal 67 and a washer 69 attached to the shaft with a set screw 71, as shown. Means, not shown, for rotating drive shafts 65 may comprise an electric motor chain drive or any other suitable device.

The outer casing or block 73 of pump 63 may be eccentrically drilled to support a bearing sleeve 75 retained in position by an end plate 77 which is fastened to block 73 by means of bolts such as shown at 79. The input portion of the pump may comprise an eccentrically drilled block 81 apertured to form a communication channel with aperture 61 in reservoir bottom plate 55. In the particular embodiment shown it was found desirable to include apertures 83 into which bottom heaters could be inserted for use in conjunction with side heaters such as shown at 84.

Rotor 85 is attached to and rotated by shaft 65 for providing a flow of molten solder up through central aperture 87 in reservoir bottom plate 55 against a supported baffle plate 88. Solder flow from around the baffle plate passes up through the reservoir through a tapered conduit comprising side plates 89 which may be made in one piece if desired or in sections as shown. The upper and output end of the restricted passage formed by side plates 89 passes the solder flow into the output orifice or aperture 13 shown more clearly in FIG. 1 and described above.

For a solder reservoir with a volume of approximately 800 pounds of solder it was found desirable to utilize about 6000 watts of heating capacity to bring the solder to a molten state and up to a working temperature of around 475 degrees Farenheit with about 3000 watts of heating capacity being used to maintain the solder at the working temperature while the unit was in operation.

Thus it can be seen that the use of an adjustable skirt 21 and an adjustable apron 17 makes it possible to control both the immersion rate and the emersion rate of component terminals from the molten solder. Due to the wide range of material to be soldered and the various types of flux and solder which may be used skirt 21 and apron 17 should be adjusted by test to an angle with the horizontal plane which minimizes or eliminates formation of solder tears and spiders and which minimizes heat warpage of the insulating board.

If either the emersion rate or the immersion rate is too slow, danger of circut board warpage and danger of overheating the circuit components mounted thereon is increased. If the emersion rate is too rapid icicles or tears of hardened solder will tend to form on the bottom portion of terminals 33.

While there has been shown and described what is at present considered the preferred embodiment of the invention, in view of this disclosure it will become obvious to those skilled in the art that various changes and modifications may be made without departing from the invention as defined in the appended claims.

Having thus described our invention, we claim:

1. In a device for applying molten solder to the under side of a circuit board having depending component terminals the combination comprising a reservoir for molten solder, means for forming a solder wave which crests along a given axis above the reservoir solder level, means for advancing and guiding circuit boards in a horizontal plane over the solder wave transverse to said given axis with the lower surface of the circuit board and depending component terminals in intimate contact with the crest of the molten solder wave, said advancing means moving said circuit boards through the solder wave at a given rate, an abrupt overflow lip on the input side of the solder wave for providing relatively rapid immersion of the component terminals depending from said circuit board and an extended overflow apron on the output side of the solder wave formed to provide relatively gradual emersion of the component terminals from the surface of the solder flowing over said apron.

2. In a device for applying molten solder to the under side of a circuit board having depending component terminals the combination comprising a reservoir for molten solder, means for forming a solder wave which crests along a given axis above the reservoir solder level, means for advancing and guiding circuit boards in a horizontal plane over said solder wave transverse to said given axis with the lower surface of the circuit board and depending component terminals in intimate contact with the crest of the molten solder wave, said advancing means moving said circuit boards through the solder wave at a given rate, an abrupt overflow lip on the input side of the solder wave for providing relatively rapid immersion of the component terminals depending from said circuit board and an extended overflow apron on the output side of the solder wave formed to provide an adjustable angle of decline for relatively gradual emersion of the component terminals from the surface of the solder flowing over said apron.

3. In a device for applying molten solder to the under side of a circuit board having depending component terminals the combination comprising a reservoir for molten solder, means for forming a solder wave which crests along a given axis above the reservoir solder level, guide and support means having an input end and an output end for guiding and supporting circuit boards over said solder wave transverse to said given axis with the lower surface of the circuit boards and depending component terminals in intimate contact with the crest of the molten solder wave, an abrupt overflow lip on the input side of the solder wave formed to provide a relatively rapid immersion rate and an extended overflow apron on the output side of the solder wave formed to provide a relatively gradual separation rate between the surface of the molten solder and the component terminals depending from said circuit board.

4. In a device for applying molten solder to the under side of a circuit board having depending component terminals the combination comprising means for forming a solder wave which crests along a given axis above a given level, guide and support means having an input end and an output end for guiding and supporting circuit boards over said solder wave transverse to said given axis with the lower surface of the circuit boards and depending component terminals in intimate contact with at least the crest of the molten solder wave, an overflow lip on the input side of the solder wave formed to provide a relatively rapid immersion rate and an extended overflow apron on the output side of the solder wave formed to provide a relatively gradual separation rate between the surface of the molten solder and the component terminals depending from said circuit board.

5. In a circuit board soldering process the steps comprising advancing circuit boards having downwardly depending electrical component terminals along a given path in a substantially horizontal plane, providing a wave of molten solder having a crest axis transverse to said given path in contact with the lower surface of circuit boards passing thereover, deflecting overflow solder from the solder wave on the input side of the solder wave along an abrupt decline and deflecting overflow solder on the output side of the solder wave along a gradual decline through and past the solder surface area where the depending component terminals emerge from the solder.

References Cited in the file of this patent

UNITED STATES PATENTS

| | | |
|---|---|---|
| 1,947,689 | Young | Feb. 20, 1934 |
| 2,344,589 | Bogner | Mar. 21, 1944 |
| 2,870,532 | Young | Jan. 27, 1959 |

FOREIGN PATENTS

| | | |
|---|---|---|
| 538,904 | Germany | Dec. 19, 1926 |
| 712,109 | Great Britain | July 21, 1954 |